US009205461B2

(12) United States Patent
Norris et al.

(10) Patent No.: US 9,205,461 B2
(45) Date of Patent: Dec. 8, 2015

(54) METHOD AND SYSTEM FOR DELIVERY POINT MULTIPLICATION

(75) Inventors: Michael O. Norris, Colleyville, TX (US); Floyd W. Worth, Richardson, TX (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 780 days.

(21) Appl. No.: 13/411,702

(22) Filed: Mar. 5, 2012

(65) Prior Publication Data

US 2013/0035782 A1 Feb. 7, 2013

Related U.S. Application Data

(60) Provisional application No. 61/514,655, filed on Aug. 3, 2011.

(51) Int. Cl.
*G06F 7/00* (2006.01)
*B07C 3/00* (2006.01)

(52) U.S. Cl.
CPC ........................................ *B07C 3/00* (2013.01)

(58) Field of Classification Search
None
See application file for complete search history.

(56) References Cited

U.S. PATENT DOCUMENTS

2002/0023861 A1* 2/2002 Mileaf et al. .................. 209/542
2009/0173669 A1* 7/2009 Zimmermann ................ 209/3.1
2012/0095591 A1 4/2012 Wilson

FOREIGN PATENT DOCUMENTS

EP 2078569 A1 7/2009
JP 08089903 A * 4/1996
JP 08099064 A * 4/1996

OTHER PUBLICATIONS

PCT Invitation to Pay Additional Fees mailed Oct. 17, 2012 corresponding to PCT International Application No. PCT/US2012/048043 filed Jul. 25, 2012 (6 pages).

PCT International Search Report mailed Feb. 19, 2013 corresponding to PCT International Application No. PCT/US2012/048043 filed Jul. 25, 2012 (13 pages).

Translated Japanese Office Action mailed Apr. 6, 2015 corresponding to Japanese Application No. 2014-523964 filed Jul. 25, 2012 (12 pages).

* cited by examiner

*Primary Examiner* — Yolanda Cumbess

(57) ABSTRACT

System, methods, and computer-readable media. A method performed by a mail sorting machine includes receiving a plurality of mailpieces in an input of the mail sorting machine and sorting the mailpieces into a plurality of sequencing groups. The method includes storing a first subset of the mailpieces in each sequencing group. The method includes sorting a second subset of the mailpieces in each sequencing group to a plurality of outlets, where storing the first subset and sorting the second subset are performed for each sequencing group by processing each sequentially in a group order. The method includes sorting the stored first subset mailpieces to the plurality of outlets.

17 Claims, 10 Drawing Sheets

GROUPED DELIVERY POINTS IN OUTLETS AFTER FIRST PASS SORTATION

| P1 | P2 | P3 | P4 | P5 | P6 | P7 | P8 | P9 | P10 |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

FIG. 2A

GROUPED DELIVERY POINTS IN OUTLETS AFTER FIRST PASS SORTATION

| P1 | P2 | P3 | P4 | P5 | P6 | P7 | P8 | P9 | P10 |
|---|---|---|---|---|---|---|---|---|---|
| 1 | 2 | 3 | 4 | 5 | 6 | 7 | 8 | 9 | 10 |
| 11 | 12 | 13 | 14 | 15 | 16 | 17 | 18 | 19 | 20 |
| 21 | 22 | 23 | 24 | 25 | 26 | 27 | 28 | 29 | 30 |
| 31 | 32 | 33 | 34 | 35 | 36 | 37 | 38 | 39 | 40 |
| 41 | 42 | 43 | 44 | 45 | 46 | 47 | 48 | 49 | 50 |
| 51 | 52 | 53 | 54 | 55 | 56 | 57 | 58 | 59 | 60 |
| 61 | 62 | 63 | 64 | 65 | 66 | 67 | 68 | 69 | 70 |
| 71 | 72 | 73 | 74 | 75 | 76 | 77 | 78 | 79 | 80 |
| 81 | 82 | 83 | 84 | 85 | 86 | 87 | 88 | 89 | 90 |
| 91 | 92 | 93 | 94 | 95 | 96 | 97 | 98 | 99 | 100 |

| P1 | P2 | P3 | P4 | P5 | P6 | P7 | P8 | P9 | P10 |
|---|---|---|---|---|---|---|---|---|---|
| 1 | 11 | 21 | 31 | 41 | 51 | 61 | 71 | 81 | 91 |
| 2 | 12 | 22 | 32 | 42 | 52 | 62 | 72 | 82 | 92 |
| 3 | 13 | 23 | 33 | 43 | 53 | 63 | 73 | 83 | 93 |
| 4 | 14 | 24 | 34 | 44 | 54 | 64 | 74 | 84 | 94 |
| 5 | 15 | 25 | 35 | 45 | 55 | 65 | 75 | 85 | 95 |
| 6 | 16 | 26 | 36 | 46 | 56 | 66 | 76 | 86 | 96 |
| 7 | 17 | 27 | 37 | 47 | 57 | 67 | 77 | 87 | 97 |
| 8 | 18 | 28 | 38 | 48 | 58 | 68 | 78 | 88 | 98 |
| 9 | 19 | 29 | 39 | 49 | 59 | 69 | 79 | 89 | 99 |
| 10 | 20 | 30 | 40 | 50 | 60 | 70 | 80 | 90 | 100 |

SEQUENCED (DELIVERY POINTS) NUMBERS IN OUTLETS AFTER SECOND PASS SORTATION

FIG. 2B

FIG. 3A

GROUPED DELIVERY POINTS IN OUTLETS AFTER FIRST PASS SORTATION RADIX PLUS

| P1 | P2 | P3 | P4 | P5 | P6 | P7 | P8 | P9 | P10 |
|---|---|---|---|---|---|---|---|---|---|
| 1 | 3 | 5 | 7 | 9 | 11 | 13 | 15 | 17 | 19 |
| 21 | 23 | 25 | 27 | 29 | 31 | 33 | 35 | 37 | 39 |
| 41 | 43 | 45 | 47 | 49 | 51 | 53 | 55 | 57 | 59 |
| 61 | 63 | 65 | 67 | 69 | 71 | 73 | 75 | 77 | 79 |
| 81 | 83 | 85 | 87 | 89 | 91 | 93 | 95 | 97 | 99 |
| 101 | 103 | 105 | 107 | 109 | 111 | 113 | 115 | 117 | 119 |
| 121 | 123 | 125 | 127 | 129 | 131 | 133 | 135 | 137 | 139 |
| 141 | 143 | 145 | 147 | 149 | 151 | 153 | 155 | 157 | 159 |
| 161 | 163 | 165 | 167 | 169 | 171 | 173 | 175 | 177 | 179 |
| 181 | 183 | 185 | 187 | 189 | 191 | 193 | 195 | 197 | 199 |
| 2 | 4 | 6 | 8 | 10 | 12 | 14 | 16 | 18 | 20 |
| 22 | 24 | 26 | 28 | 30 | 32 | 34 | 36 | 38 | 40 |
| 42 | 44 | 46 | 48 | 50 | 52 | 54 | 56 | 58 | 60 |
| 62 | 64 | 66 | 68 | 70 | 72 | 74 | 76 | 78 | 80 |
| 82 | 84 | 86 | 88 | 90 | 92 | 94 | 96 | 98 | 100 |
| 102 | 104 | 106 | 108 | 110 | 112 | 114 | 116 | 118 | 120 |
| 122 | 124 | 126 | 128 | 130 | 132 | 134 | 136 | 138 | 140 |
| 142 | 144 | 146 | 148 | 150 | 152 | 154 | 156 | 158 | 160 |
| 162 | 164 | 166 | 168 | 170 | 172 | 174 | 176 | 178 | 180 |
| 182 | 184 | 186 | 188 | 190 | 192 | 194 | 196 | 198 | 200 |

*FIG. 3B*

SEQUENCED (DELIVERY POINT) NUMBERS IN OUTLETS AFTER SECOND PASS SORTATION

| P1 | P2 | P3 | P4 | P5 | P6 | P7 | P8 | P9 | P10 |
|---|---|---|---|---|---|---|---|---|---|
| 1 | 21 | 41 | 61 | 81 | 101 | 121 | 141 | 161 | 181 |
| 2 | 22 | 42 | 62 | 82 | 102 | 122 | 142 | 162 | 182 |
| 3 | 23 | 43 | 63 | 83 | 103 | 123 | 143 | 163 | 183 |
| 4 | 24 | 44 | 64 | 84 | 104 | 124 | 144 | 164 | 184 |
| 5 | 25 | 45 | 65 | 85 | 105 | 125 | 145 | 165 | 185 |
| 6 | 26 | 46 | 66 | 86 | 106 | 126 | 146 | 166 | 186 |
| 7 | 27 | 47 | 67 | 87 | 107 | 127 | 147 | 167 | 187 |
| 8 | 28 | 48 | 68 | 88 | 108 | 128 | 148 | 168 | 188 |
| 9 | 29 | 49 | 69 | 89 | 109 | 129 | 149 | 169 | 189 |
| 10 | 30 | 50 | 70 | 90 | 110 | 130 | 150 | 170 | 190 |
| 11 | 31 | 51 | 71 | 91 | 111 | 131 | 151 | 171 | 191 |
| 12 | 32 | 52 | 72 | 92 | 112 | 132 | 152 | 172 | 192 |
| 13 | 33 | 53 | 73 | 93 | 113 | 133 | 153 | 173 | 193 |
| 14 | 34 | 54 | 74 | 94 | 114 | 134 | 154 | 174 | 194 |
| 15 | 35 | 55 | 75 | 95 | 115 | 135 | 155 | 175 | 195 |
| 16 | 36 | 56 | 76 | 96 | 116 | 136 | 156 | 176 | 196 |
| 17 | 37 | 57 | 77 | 97 | 117 | 137 | 157 | 177 | 197 |
| 18 | 38 | 58 | 78 | 98 | 118 | 138 | 158 | 178 | 198 |
| 19 | 39 | 59 | 79 | 99 | 119 | 139 | 159 | 179 | 199 |
| 20 | 40 | 60 | 80 | 100 | 120 | 140 | 160 | 180 | 200 |

METHOD AND SYSTEM FOR DELIVERY POINT MULTIPLICATION

CROSS-REFERENCE TO OTHER APPLICATIONS

This application claims the benefit of the filing date of U.S. Provisional Patent Application 61/514,655, filed Aug. 3, 2011, which is hereby incorporated by reference. This application includes some subject matter in common with U.S. Provisional Patent Application 61/393,535, filed Oct. 15, 2010, and U.S. patent application Ser. No. 13/274,860, filed Oct. 17, 2011, which are hereby incorporated by reference.

TECHNICAL FIELD

The present disclosure is directed, in general, to sorting machines and methods, with particular application to postal processing systems.

BACKGROUND OF THE DISCLOSURE

Improved postal processing and other systems are desirable.

SUMMARY OF THE DISCLOSURE

Various disclosed embodiments include a system and method. A method performed by a mail sorting machine includes receiving a plurality of mailpieces in an input of the mail sorting machine and sorting the mailpieces into a plurality of sequencing groups. The method includes storing a first subset of the mailpieces in each sequencing group. The method includes sorting a second subset of the mailpieces in each sequencing group to a plurality of outlets, where storing the first subset and sorting the second subset are performed for each sequencing group by processing each sequentially in a group order. The method includes sorting the stored first subset mailpieces to the plurality of outlets.

Another method includes receiving a plurality of mailpieces in an input of the mail sorting machine and assigning a plurality of first-pass sort criteria to each of a plurality of first-pass outlets. The first-pass sort criteria includes at least a first sort criterion and a second sort criterion. The method includes sorting the mailpieces in a first pass to the first pass-outlets according to the sort criteria. The method includes assigning at least one second-pass sort criterion to each of a plurality of second-pass outlets, and transferring the mailpieces in each first-pass outlet that match the first sort criterion to a buffer. The method includes sorting the mailpieces in each first-pass outlet that match the second sort criterion into the second-pass outlets according to the second-pass sort criterion, sorting the mailpieces in the buffer into the second-pass outlets according to the second-pass sort criterion.

Other embodiments include a mail sorting machine configured to perform processes described herein. In some embodiments, the mail sorting machine includes at least one controller, a feeder configured to receive a plurality of mailpieces, and a plurality of outlets. The mail sorting machine can be configured to sort the mailpieces into a plurality of sequencing groups, and store a first subset of the mailpieces in each sequencing group in a buffer feeder. The mail sorting machine can be configured to sort a second subset of the mailpieces in each sequencing group to the plurality of outlets, wherein storing the first subset and sorting the second subset are performed for each sequencing group by processing each sequentially in a group order. The mail sorting machine can be configured to sort the stored first subset mailpieces from the buffer feeder to the plurality of outlets.

Other embodiments include a non-transitory computer readable medium having program instructions stored thereon executable by one or more processors to control the operation of a mail sorter. The mail sorter has at least one sort control unit The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms “include” and “comprise,” as well as derivatives thereof, mean inclusion without limitation; the term “or” is inclusive, meaning and/or; the phrases “associated with” and “associated therewith,” as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term “controller” means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 2A shows a simplified matrix of sequenced mailpieces after the first pass of a two-pass operation, and FIG. 2B shows a simplified matrix of sequenced mailpieces after the second pass of a two-pass operation;

FIG. 3A illustrates a simplified matrix representing the results of a sort operation in accordance with disclosed embodiments, and FIG. 3B shows a matrix with sequenced delivery points of the radix plus process after the second pass has been completed in accordance with disclosed embodiments;

DETAILED DESCRIPTION

Figure 1:
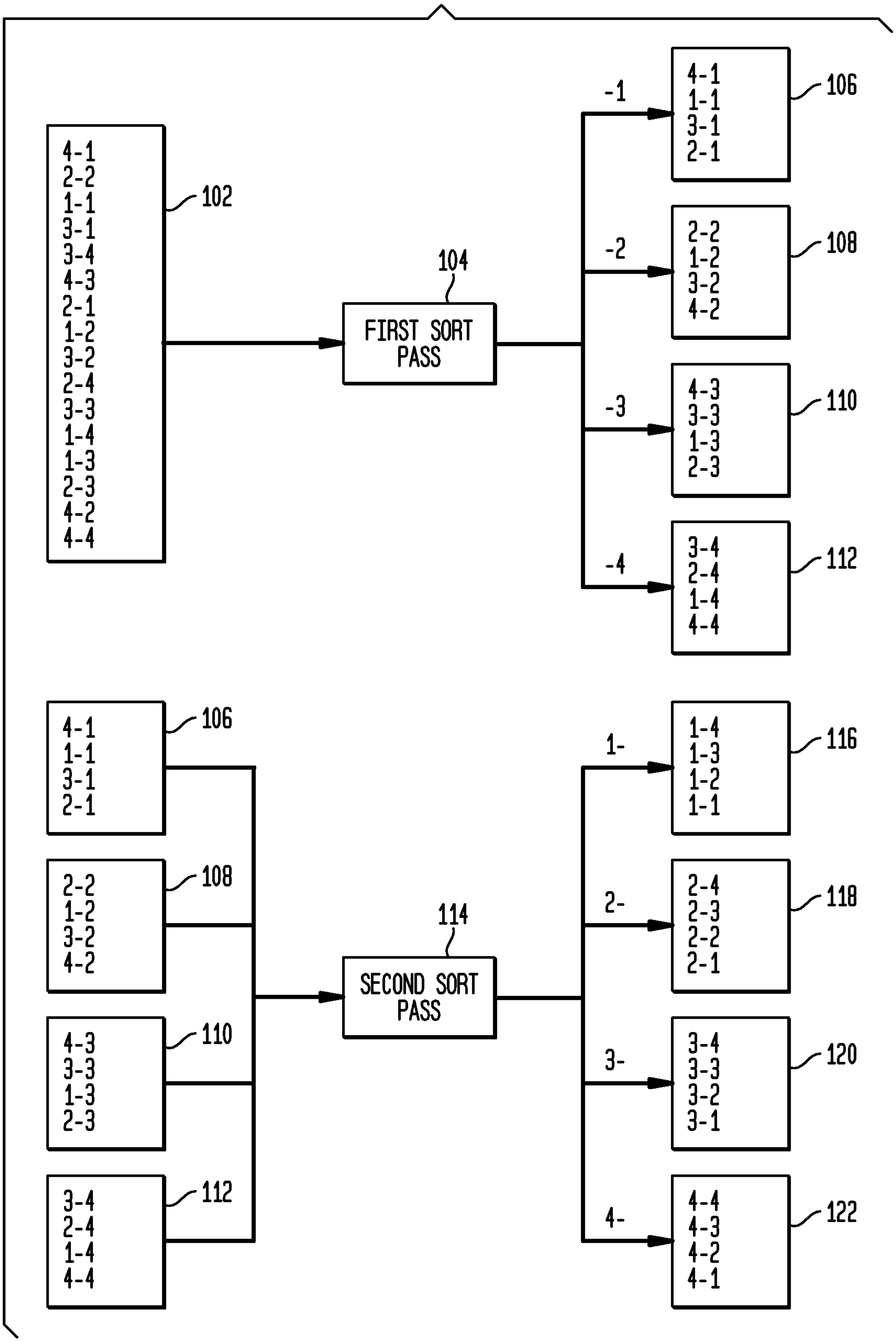
FIG. 1 depicts an example of a sort process.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Postal services have been automatically sorting mail to delivery point carrier-walk sequences since the early nineties. The basic principle used is referred to as a radix sort. Mail is fed on multiple passes to achieve the desired sequence.

In a two-pass sequencing sortation, described in more detail below, the number of delivery points that can be sequenced is determined by the number of available outlets or trays in the first pass multiplied by the number of available outlets in the second pass. For example, a ten-outlet machine can sequence 100 delivery points (10×10=100).

On the first pass, mail is sorted to groups equaling the wrap rate of the available outlets. For example, a ten outlet machine sequencing 100 delivery points, would sort sequence numbers 01,11,21,31,41,51,61,71,81,91 in the first outlet on the first pass. The second outlet would receive sequence numbers 02,12,22,32,42,52,62,72,82,92. Each available outlet thereafter receives a series of delivery points until all 100 delivery points are grouped.

On the second pass, mail is fed into the machine in outlet order. Each of the mail pieces from outlet one will be the first mail pieces sorted to the available 10 outlets. Outlet 1 will receive sequence one and outlet two will receive sequence 11 and so forth until all the mail originally sorted to outlet one is sorted.

Next, the mail sorted to the second outlet in pass one is sorted and outlet one will receive sequence two mail behind the already sorted group one mailpieces. Outlet two will receive sequence 12 mail behind the already-sequenced 11. This order is repeated until all 100 sequences are sorted in order.

At the end of the second pass, outlet one will contain sequence 1 through 10 in order. Outlet two will contain sequence 11 through 20 in order and so on.

Similarly, a 200 bin machine could process mail to 40,000 sort destinations, assuming all bins are used for both passes. The current trend in mail sorting is that the number of sort destinations is increasing while the volume of mail is decreasing. Therefore, the number of machines required to sort the mail is increasing while the amount of mail sorted on each machine is decreasing.

FIG. 1 depicts an example of a sort process. Note that while two "sorters" are shown here, both passes can be performed by the same sorter. For purposes of this illustration, the items are labeled to show the sort criteria in the form "X-Y", where Y is the first sort criteria and X is the second sort criteria. In a least-significant-bit radix sort, for example, items numbered with the format 000XY would sort first on the "Y" digit, accumulate the results of that sort in order, and then sort those on the "X" digit. The results would be the elements in order according to the XY digits.

In a postal processing example, the mail pieces will typically have already been identified and are processed according to such criteria as delivery routes and delivery points along each of those routes. In this example, using such an "X-Y" designator for the sort criteria, the "X" may indicate a delivery route, and the "Y" may indicate the order of the delivery points on that route. So after sorting, the "2-1" mailpiece(s)—directed to the first ("1") delivery point on the "2" route—should come before the "2-3" mailpiece(s), which are destined for the third ("3") delivery point on the "2" route.

In FIG. 1, an initial mail tray 102 includes unsorted mailpieces that have been designated, using techniques known to those of skill in the art, to be sorted to specific delivery routes and delivery points on each of those routes.

The mailpieces from the initial tray 102 go through a first sort pass, using a conventional mail sorter in this example, to sort them first by delivery points (the "Y" value). The mail is sorted into trays (or bins, shelves, or other known storage devices, all referred to herein as "trays"). Tray 106 receives all the mailpieces for a first delivery point on any delivery route (indicated by the "−1"), tray 108 receives all the mailpieces for a second delivery point on any delivery route (indicated by the "−2"), tray 110 receives all the mailpieces for a third delivery point on any delivery route (indicated by the "−3"), and tray 112 receives all the mailpieces for a fourth delivery point on any delivery route (indicated by the "−4"). The mailpieces in each tray are not yet sorted by route.

The mailpieces from the first pass 104 are then sorted on a second pass 114 to sort them by delivery routes (the "X" value). Each of the trays 106-112 are fed into the second sort pass 114 in order, and are sorted into trays based on the delivery route. Tray 116 receives all the mailpieces for a first delivery route (indicated by the "1−"), tray 118 receives all the mailpieces for a second delivery route (indicated by the "2−"), tray 120 receives all the mailpieces for a third delivery route (indicated by the "3−"), and tray 122 receives all the mailpieces for a fourth route (indicated by the "4−").

Because each of the trays 106-112 was already segregated by delivery points, the second sort pass, sorting by delivery route, results in trays 116-122 each having all mailpieces sorted in delivery point order, where each tray contains a delivery route.

Note that this technique is limited in the number of potential delivery points/routes based on the number of trays handled by the sorter.

In principle, when more delivery points need to be sequenced, additional outlets can be added or additional sorting passes can be added. For example, a machine with ten available outlets can sequence 1,000 delivery points in a three-pass operation. In a three-pass sequencing sortation, the number of delivery points that can be sequenced is determined by the number of available outlets on the first pass, multiplied by the number available on the second pass, multiplied by the number available outlets on the third pass. Today, the actual sorting algorithms can vary but the basic principle of radix sorting remains constant.

A negative effect resulting from multi-pass sorting is a reduction in throughput capacity. For example, a 100-outlet machine can sequence 100 delivery points in a single pass. A machine running at 1,000 pieces/hour can sequence 500 mailpieces to 100 delivery points in one half hour.

If a ten outlet machine running at the same speed is used in a two-pass operation, the same 500 pieces using a two-pass operation will take at a minimum twice the time to sequence or one hour. Therefore, manpower to do two-pass sequencing will also increase. Adding outlets has the limitation of available floorspace, electrical power to operate the outlets and capital cost of the additional outlets.

FIG. 2A shows a simplified matrix of sequenced mailpieces after the first pass of a two-pass operation. For this example, a ten outlet machine is used, illustrated as P1-P10, and a conventional radix algorithm is employed. Typically there are 2 to 3.5 mail pieces per each delivery point. Mail is fed into the machine in a random order on the first pass and any piece in a outlet can be positioned relative to any other piece in the same outlet. Although not illustrated in this figure, sequence 41 could be in the first position of outlet one (P1). Pieces are sorted to groups with no regard to piece order during the first pass of a two-pass operation. Group one in outlet 1 can be multiple mail pieces having delivery points 1, 11, 21, 31, 41, 51, 61, 71, 81, 91, in any relative order.

FIG. 2B shows a simplified matrix of sequenced mailpieces after the second pass of a two-pass operation, with arrows indicating how certain groups of mail move from the first pass to the second pass. As can be seen, mail from P1 of the first pass is fed first. The arrows show that the P1 mail will be in the first position of each outlet on the second pass. After all mail from P1 is sorted, mail from P2 will be fed and be sorted to the second position behind the first pass P1 mail. This process is repeated with P3 sorted mail and so on until all mail is sequenced.

Disclosed embodiments include a system and method that can increase the number of delivery points that can be sequenced for a set number of outlets.

One disclosed method for sequencing mail pieces includes sorting mail on a first pass of a two-pass mail sorting operation into groups equaling more delivery points than the conventional radix sort. The method includes feeding the first group on a second pass, sorting a subset of the delivery points into outlets and buffering another subset of delivery points. Upon completion of sorting the all mail in group one on a second pass, the method includes releasing the stored subset of delivery points from the buffers to be sorted into outlets behind the first subset of delivery points and repeating the process for every subsequent group to be processed until all mail is delivery point sequenced.

Various embodiments include a sorting apparatus, described in more detail below, that includes a primary mail path for delivering a subset of a group of mail to outlets, a diverter gate to deliver a subset of a group of delivery points to a buffering and storage device, a pick-off mechanism for removing mail form the storage device, a mail path which merges a subset of mail into the primary mail path, and a controlling device that controls the operation of the apparatus.

A diverter gate can be implemented as described in U.S. Pat. No. 6,533,271 B1, hereby incorporated by reference, and a buffering and storage device can be implemented as described in U.S. Pat. No. 7,845,484 B1, hereby incorporated by reference.

FIG. 3A illustrates a simplified matrix representing the results of a sort operation in accordance with disclosed embodiments, showing sequenced mailpieces after the first pass of a two-pass operation are shown. For this example, a ten-outlet machine is used and a "radix plus" process as disclosed herein is used.

This example shows that a multiplier of 2× will be used, which doubles the effective number of delivery points that can be sequenced. On the first pass, mail is sorted into ten groups of twenty odd and even delivery points. As illustrated in this example, outlet P1 receives the −1 and −2 mailpieces, outlet P2 receives the −3 and −4 mailpieces, etc. Note that while this example shows the mailpieces in each outlet in sort order, in a typical implementation, the appropriate mailpieces are sorted to each outlet, but are unsorted in the outlet itself.

As with a conventional radix sort, mail is fed on the second pass starting with the first outlet P1, then P2, and so on, in outlet order. According to a disclosed embodiment, a first subset such as the odd-number delivery points of group one, will be sorted into outlets as in the conventional radix sorting, and a second subset, such as the even number delivery points of group one, will be buffered in the object of this invention.

The system controller memory determines when the last mailpiece of the first subset in group one has been fed, the odd mailpieces in this example, such as by tracking how many mail pieces are in each subset. In this embodiment, the controller will then command the feeder to stop picking-off mail pieces and instruct the buffers to empty the second subset of mailpieces of group one into the sorting section, which are the even mailpieces in this example.

Once all even pieces of group one have been sorted to the outlets, the controller will instruct the feeder to pick-off group two pieces from P2. The first-subset odd delivery points from P2 will be sorted and the second-subset even delivery points will be buffered. This process is repeated until all the delivery points are in sequence order.

FIG. 3B shows a matrix with sequenced delivery points of the radix plus process after the second pass has been completed in accordance with disclosed embodiments. At this point, all mailpieces have been sorted to the correct pocket, in the correct order, and the system has sorted double the number of delivery points/destinations than would be possible using a conventional, unbuffered two-pass sort.

Figure 4:
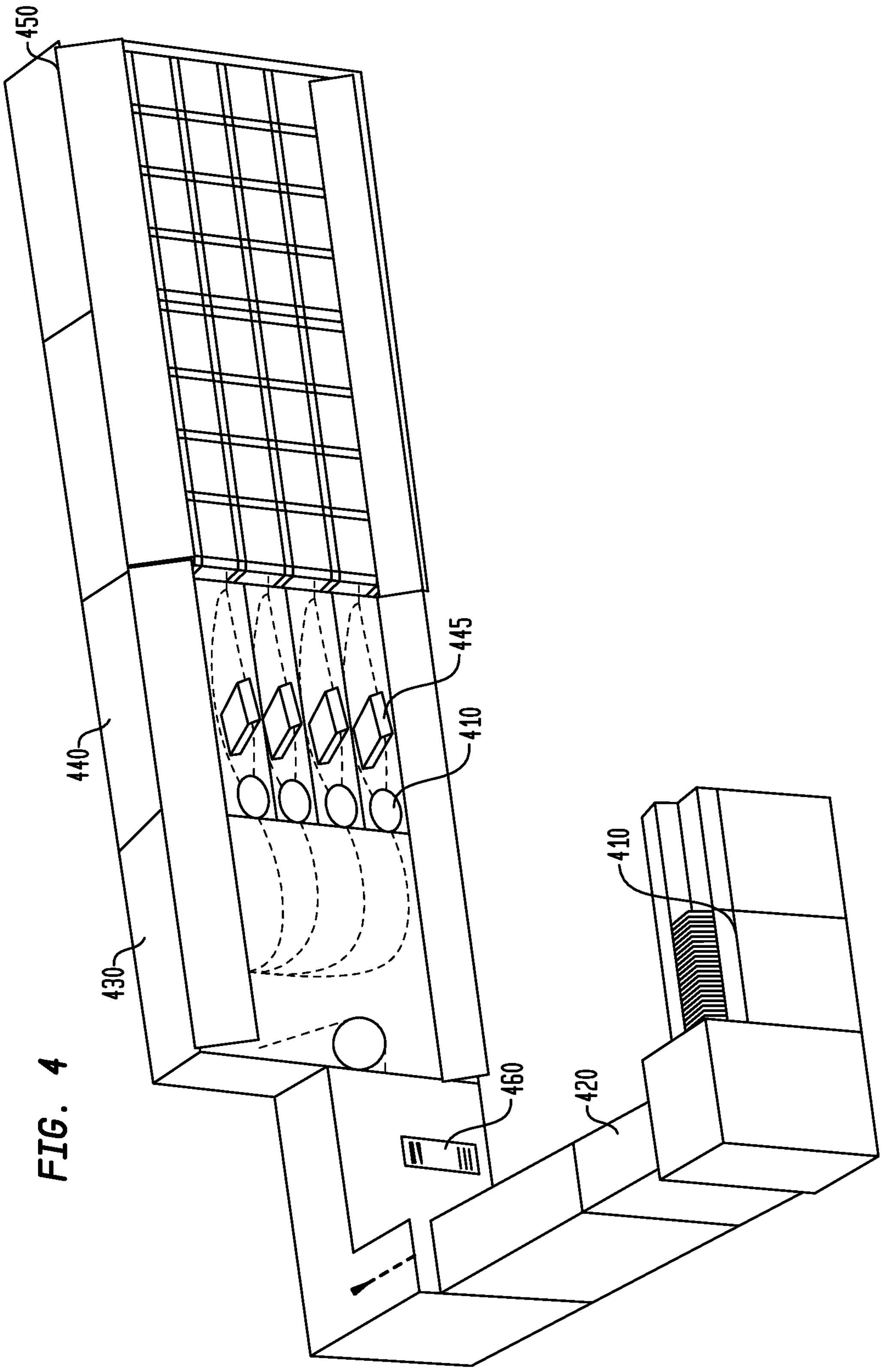
FIG. 4 is an example of a sorting machine in accordance with a disclosed embodiment.

FIG. 4 is an example of a sorting machine in accordance with a disclosed embodiment.

Mail is input into feeder 410 by an operator by placing a stack onto the feeder ledge. The pick-off belts of feeder 410 singulates the pieces. Transport 420 moves mail in single file to elevator 30, such as by using pinch-belt technology. Elevator 430 contains a reader, which reads indicia and transmits the indicia results to system controller 460. Elevator 430 twists the mail to a horizontal position and diverts pieces to one of n levels and re-twists the mail back to its original vertical position.

As mail enters a buffer module 440, the mail travels through the primary path to an assigned outlet within stacker module 450. As described herein, a controller, such as a local or system controller 460, will selectively command diverter gate 410 to activate to send the mail piece to buffer feeder 445. The buffer feeder 445 stores the mail.

When conditions are met as described herein, the system controller 460 sends a command to buffer feeder 445 to singulate mail pieces. Mail pieces exiting the buffer feeder 445 travel by pinch belt to be merged into the primary path and sorted to the assigned outlet of stacker module 450.

Figure 5A:
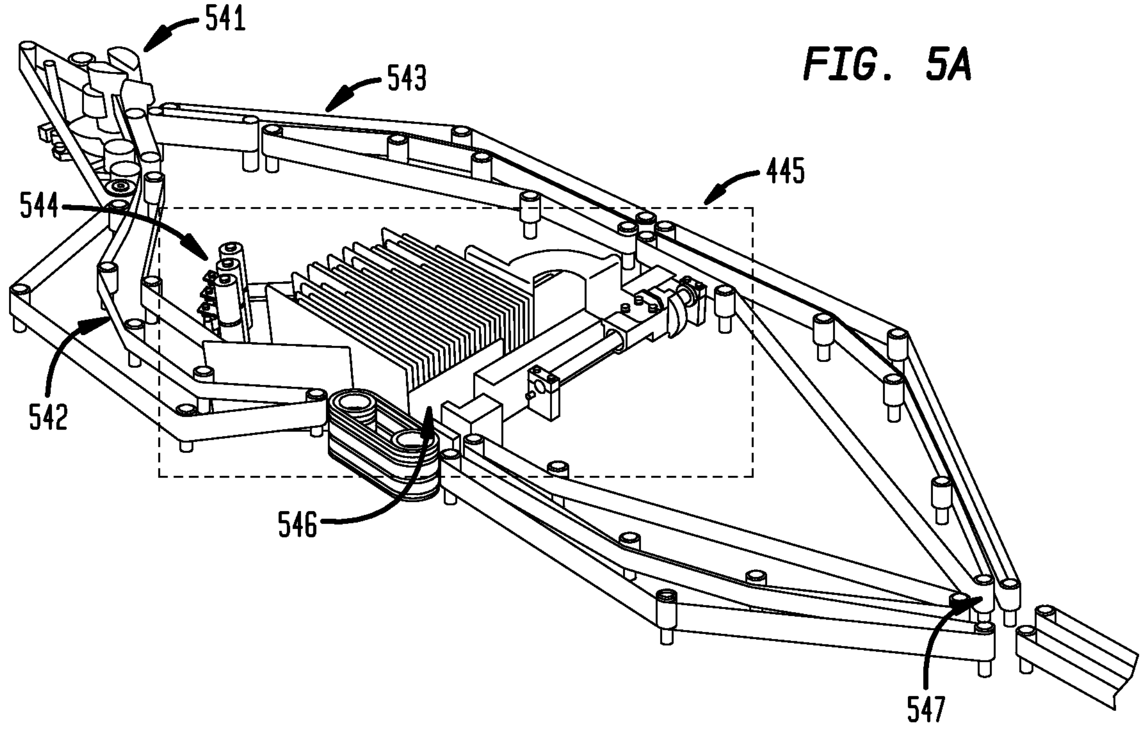
FIGS. 5A and 5B illustrate more detailed views of a buffering subsystem in accordance with disclosed embodiments.
Figure 5B:
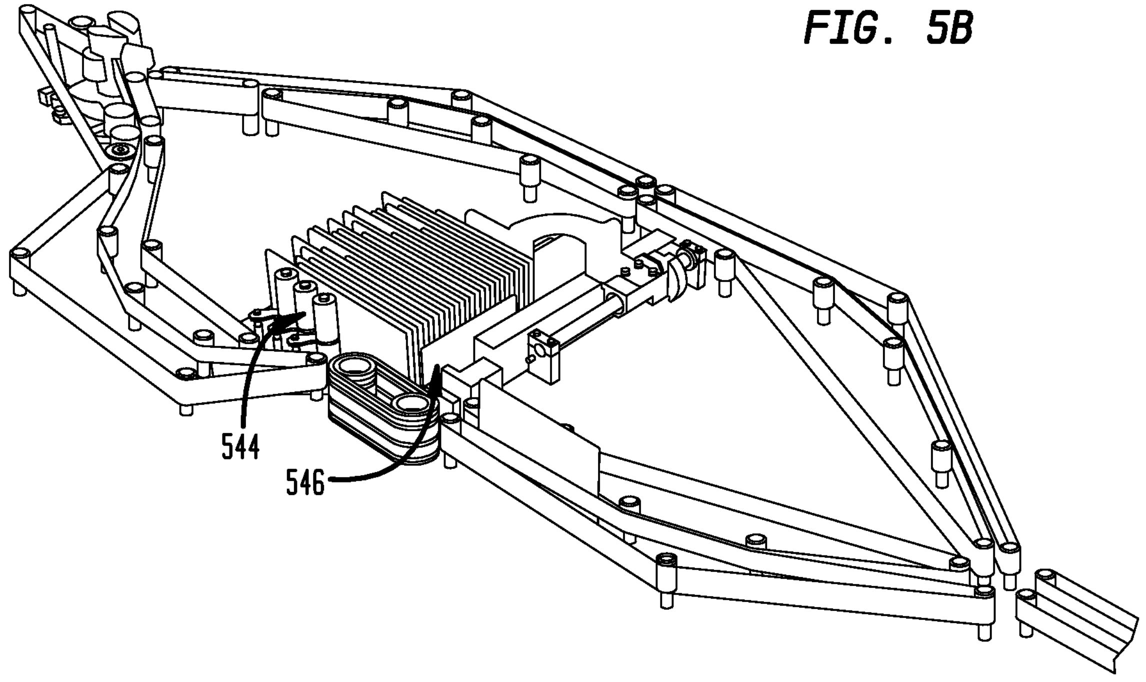

FIGS. 5A and 5B illustrate more detailed views of a buffering subsystem in accordance with disclosed embodiments, which can be used to implement a sorter as described herein, as part of buffer module 440, including a mode detailed view of buffer feeder 445. In FIG. 5A, buffer module 440 directs mail to the primary path 543 or to the buffer storage path 542 using the diverter gate 541. This figure shows the support roller assembly 544 in the receiving position and the feed stop plate 546 closed for receiving mail to be stored. The figure shows merge point 547 to the primary mail path.

FIG. 5B shows support roller assembly 544 in the feed position and the feed stop plate 546 in the open position to feed mail from the buffer to the merge point and into the primary mail path.

Various embodiments can use a range of buffer feeder sizes as needed for particular implementations, to ensure appropriate buffer feeder capacity for the second pass. Using the odd/even example above to separate the two subsets in each tray, and assuming a random mix of odd and even delivery points, only the even pieces get buffered. The odd pieces get sorted to outlets. The even pieces will be divided into levels. Each level will have a buffer storage device. The buffer capacity C can be calculated by taking the total expected volume Vg of a group divided by 2, representing a split of odd and even, and then dividing by the number of buffer splits L:

$$C = \left(\frac{V_g}{2}\right)\left(\frac{1}{L}\right)$$

With an even distribution, a sorting machine with four levels and four buffers, sequencing 80,000 pieces into 160 first pass outlets will have an average group size of 500 pieces. In the following example, the buffer capacity is calculated.

$$C = \left(\frac{V_g}{2}\right)\left(\frac{1}{L}\right) = \left(\frac{80{,}000/160}{2}\right)\left(\frac{1}{4}\right) \approx 63$$

Considering a heavy day volume as 50% above the average day volume, the needed capacity of the buffer would be 63*1.5≈94 pieces. On average, a foot of letter mail is 215 pieces. The physical storage length of a buffer with 100 pieces capacity is less than 6 inches. U.S. Pat. No. 7,845,484, incorporated herein by reference, teaches that a device for buffering and the storage space can be implemented in a very compact footprint equal to the size of an existing outlet.

In one embodiment, the buffer capacity can be used to determine the throughput degradation for sequencing twice the number of delivery points.

Figure 6:
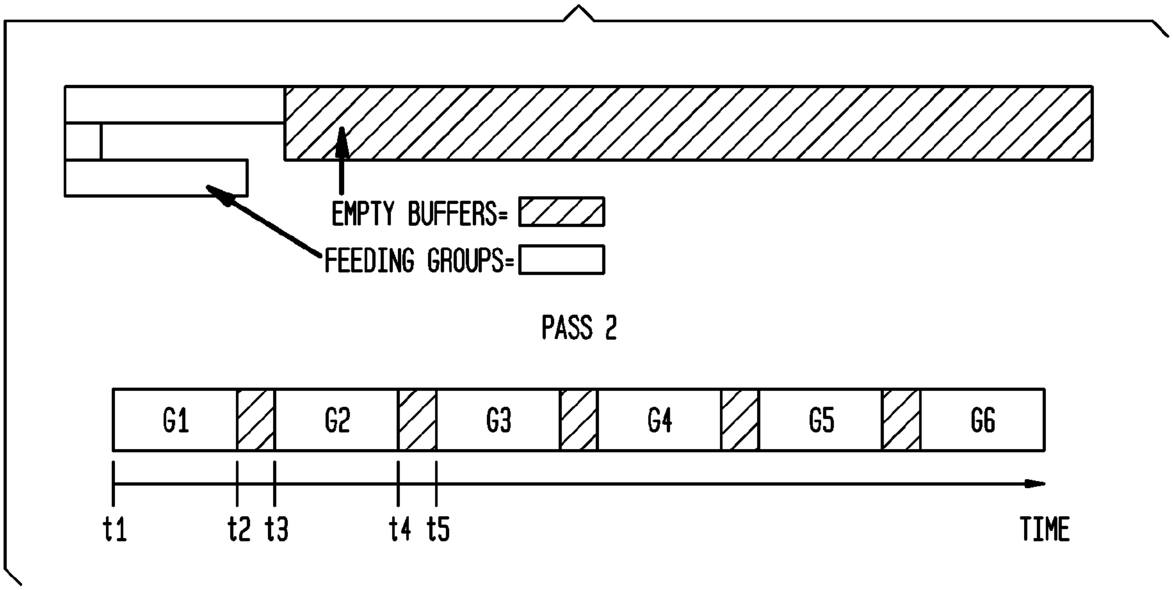
FIG. 6 illustrates an example of timing for a sorting process using techniques as described herein.

FIG. 6 illustrates an example of timing for a sorting process using techniques as described herein. The second pass starts with the feeding of the first group of mail sorted on the first pass represented as G1 at time t1. When all the mail has been sorted from the first group, the system controller commands the feeder to stop picking off mail and commands the buffer feeders to empty at time t2. When all buffers are empty, a signal is sent to the system controller and the system starts to pick-off mail from the feeder again at time t3. The second group G2 will be sorted and buffers emptied for the second group at time t4. This process is repeated until all groups have been sorted and the mail is sequenced.

A machine running at 36,000 pieces/hour can process 80,000 mail pieces in approximately 2.22 hours or 2 hours and 13.2 minutes. If there are 160 groups, then the buffers need to be emptied 160 times. The time to empty a buffer with an average piece count of 63 is 6.3 seconds in this example. 160*6.3 seconds=1,008 seconds or an additional 16.8 minutes to sequence 80,000 pieces. The total effective operational time to sequence 80,000 pieces will be 2 hours and 29.8 minutes. The effective throughput is reduced from 36,000 pieces/hour to 32,000 pieces per hour, but the number of sorted delivery points has doubled.

Figure 7:
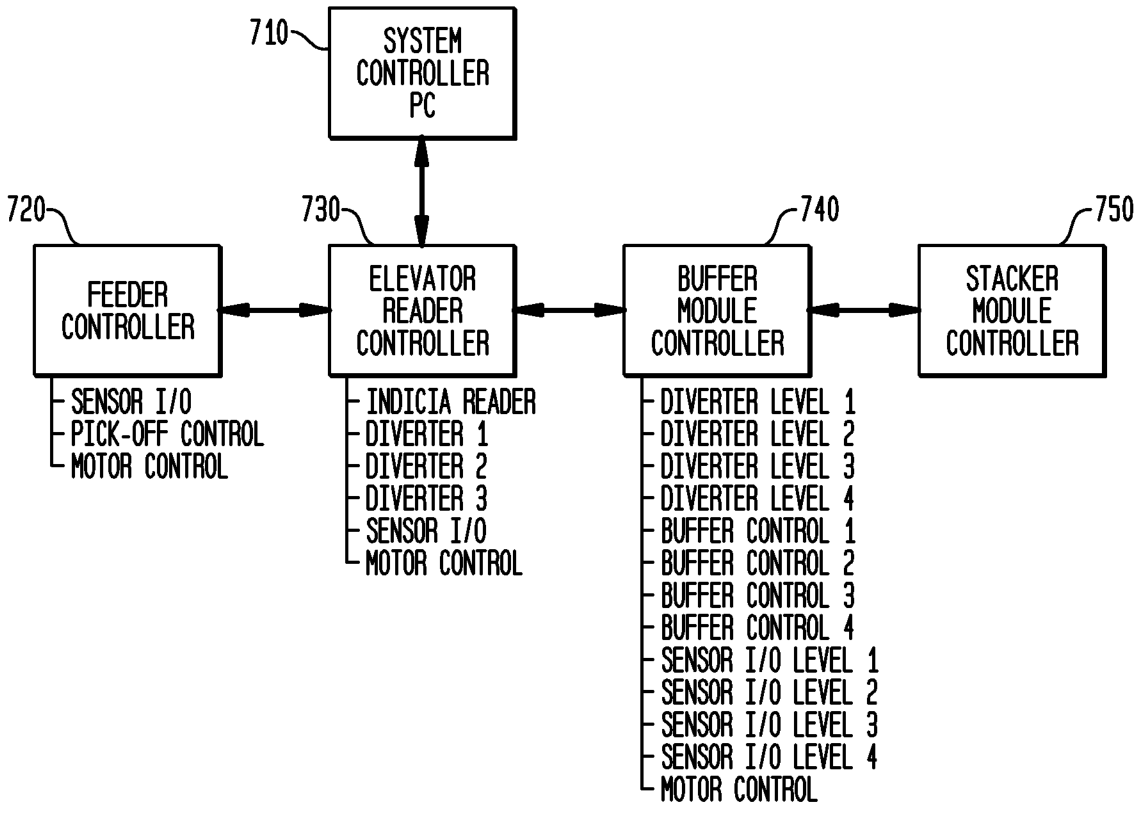
FIG. 7 depicts a simplified example of a distributed control system architecture and its operation in accordance with a disclosed embodiment.

FIG. 7 depicts a simplified example of a distributed control system architecture and its operation in accordance with a disclosed embodiment. Each of the elements below can intercommunicate with each other, using serial communications, networking over Ethernet or otherwise, wireless communications, or otherwise.

The control system can include a system controller 710, a feeder controller 720, an elevator reader controller 730, a buffer module controller 740, and a stacker module controller 750. The system can also include other conventional mail processing and sorting hardware and controllers, as will be understood by those of skill in the art.

System controller 710 can be implemented using a data processing system having a processor and accessible memory, for example.

Feeder controller 720 and the other controllers described herein can be implemented, in some embodiments, as field-programmable gate arrays (FPGAs). Feeder controller 720 can include or control such elements as a sensor input/output, pickoff control, and motor control.

Elevator reader controller 730 can include or control such elements as an indicia reader, diverters, sensor input/output, and motor control. Buffer module controller 740 can include or control such elements as an diverter levels, buffer controls, sensor inputs/outputs, and motor controls. Stacker module control 750 can include or control such elements as the stacker module.

On the first pass, the feeder controller 720 commands the pick-off control to singulate mail pieces. The mail pieces pass a camera that is part of the indicia reader and sends sort information to the system controller 710 via the elevator reader controller 730. System controller 710 compares the sort information to a sort plan loaded in memory and assigns a destination assignment to the piece and sends the data packet to the elevator reader controller 730.

Elevator reader controller 730 will track the physical location of the piece and command one of three diverter circuits to activate a gate to send a piece to one of four levels. Elevator reader controller 730 will hand off tracking and data packet information to buffer module controller 740. Buffer module controller 740 passes the tracking and data package to stacker module controller 750. Once directed to a destination the mail piece will travel the primary pinch belt path until it is diverted into a outlet. The order and destination outlet information is written to the system controller 710 memory and a table is compiled.

On the second pass, mail sorted to groups is fed into the system in order by the feeder. Indicia information is sent to the System Controller 710. System controller 710 uses the pass one table and the acquired sort information to divide the current group into subsets. Subset A will be assigned a destination outlet in the primary belt path to an outlet. Subset B will be assigned a destination outlet via one of the buffer feeders where the piece will be stored until all of current pass one group is sorted. The order mail is sent to the buffer feeders and destination outlet information is written to system controller 710 and buffer module controller 740's memory and a buffer table is compiled. System controller 710 stops the feeder pick-off after a group has been processed and commands the buffer feeders to empty the stored mail pieces. All stored mail, in all buffer feeders, are introduced into the primary mail path, and sent to a destination outlet using the buffer table information.

Controller memory predicts when all mail will be out of the buffer feeders and they will be empty. The controllers calculate when the last mail piece of subset B will be downstream of the next group to process and a command is sent to the feeder pick-off to start processing the next group to be processed. In one embodiment of the control system the controller's memory and tracking information is used to sort stored mail from the buffer feeders. In another embodiment, an indicia reader is used downstream of the buffer feeder in combination with the controller's memory and tracking information to sort stored mail from the buffer feeders. The process is repeated for every subsequent pass-one groups to be sorted.

Disclosed embodiments provide distinct technical advantages. For example, the systems and processes described herein allow postal services to combine sequencing operations for multiple zones. Typically, zones are geographical areas serviced by facilities located in different locations. Therefore, when zones are combined the mail that is not sequenced must be separated by facilities. Examples of mail that does not get sequenced are exceptions, holdouts, and carrier route sorted mail.

For example, a zone with 30 carriers gets combined with a zone with 25 carriers. During the first pass, 55 outlets cannot be used for sequencing because they are needed for carrier route sorting. In addition, there are 8 outlets needed for exceptions. There is very little volume going to these outlets and a method for increasing the outlet utilization of the first pass would be advantageous. In a 200-outlet machine configuration, the conventional radix multiplier for a system with 55 carriers and 16 exception outlets would be 129*200.

Further, in various embodiments, the buffer storage is used on the first pass to increase the number of available outlets to sequence mail pieces on the first pass by buffering carrier route mail and/or exceptions until the end of the first pass and releasing the mail stored in the buffers after completion of the first pass. Mail going to a different facility would end up behind the mail going to another facility. The operator would use a technique of fingering the sorted mail in those outlets to determine the required split to the different facilities.

Figure 8:
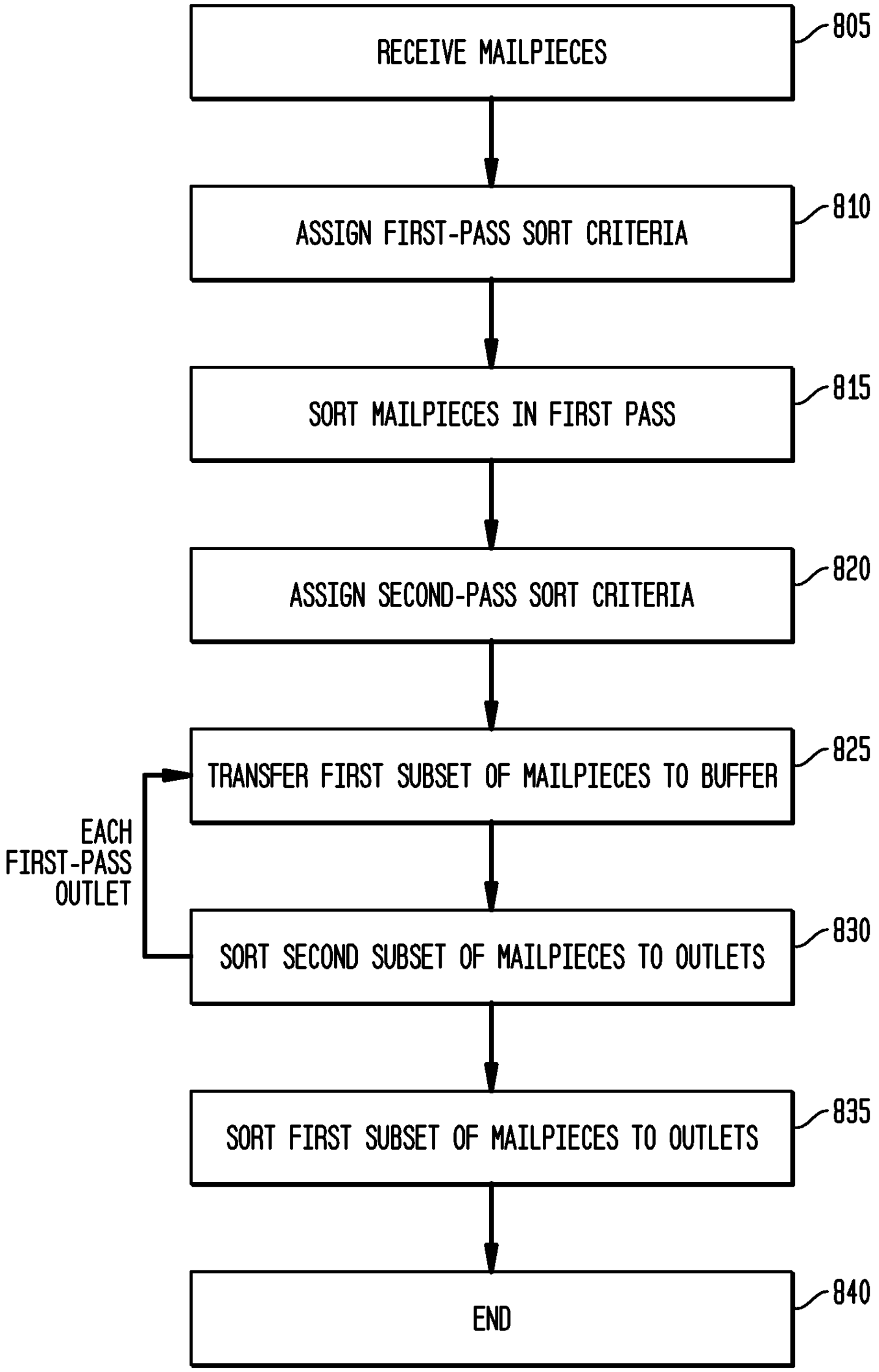
FIGS. 8 and 9 depict flowcharts of processes in accordance with disclosed embodiments.

FIG. 8 depicts a flowchart of a process in accordance with disclosed embodiments. The "system" referred to in this process can be implemented as a mail processing system, such as a mail sorter or otherwise, and can include components as described above and other mail handling and processing components known to those of skill in the art. A "mailpiece" refers to any letter, flat, parcel, package, or other object capable of being processed as described herein by a public or private mail processor, including the United States Postal Service and private courier and delivery services.

The system receives a plurality of mailpieces to be sorted to a plurality of outlets (step 805).

The system assigns a plurality of first-pass sort criteria to each of a plurality of first-pass outlets (step 810). The first-pass sort criteria include at least a first sort criterion and a second sort criterion. This step can include assigning two first-pass sort criteria to each first-pass outlet, such as assigning the first sort criterion as an even sort criterion and assigning the second sort criterion as an odd sort criterion for each first-pass output. The two first-pass sort criteria for each first-pass outlet can be, for example, two sort digits for the first pass of a two-pass radix sort, and can, in particular, be two digits of a destination code such as a ZIP code. The first-pass sort criteria can be used to define sequencing groups.

The system sorts the mailpieces in a first pass (step 815). This step can include sorting all mailpieces to the plurality of first-pass outlets by sending to each first-pass outlet each of the mailpieces that matches either of the respective at least two first-pass sort criteria.

The system assigns at least one second-pass sort criterion to each of a plurality of second-pass outlets (step 820). The second-pass outlets can be the same outlets as the first-pass outlets. The second-pass sort criterion can be, for example, another digit for the second pass of a two-pass radix sort, and can, in particular, be a digit of a destination code such as a ZIP code.

The system transfers the mailpieces in each first-pass outlet that match the first sort criterion to a buffer (step 825). In particular, this step can include automatically or manually refeeding each of the mailpieces in each first-pass outlet back into the system. The mailpieces transferred to the buffer are a first subset of the mailpieces in the first-pass outlets. The mailpieces for each of the first-pass outlets can be combined in the buffer in a sort order of the first-pass outlets.

The system sorts the mailpieces in each first-pass outlet that match the second sort criterion into second-pass outlets according to the second-pass sort criterion (step 830). These mailpieces are a second subset of the mailpieces from the first-pass outlets. In particular embodiments, steps 820 and 825 are performed concurrently for each first-pass outlet, and repeated to process each first-pass outlet sequentially; in this way, as the mailpieces from each first-pass outlet are processed by the system, some of the mailpieces are sent to the buffer as the first subset while the other mailpieces are sorted to the destination second-pass outlets.

The system sorts the mailpieces in the buffer into second-pass outlets according to the second-pass sort criterion (step 835).

The process ends (step 840). At this point, each of the second-pass outlets includes sorted mailpieces, in order. In particular examples, each second-pass outlet now includes mailpieces that are properly sorted to two destination sets (each having two digits) in a destination radix sort.

Figure 9:
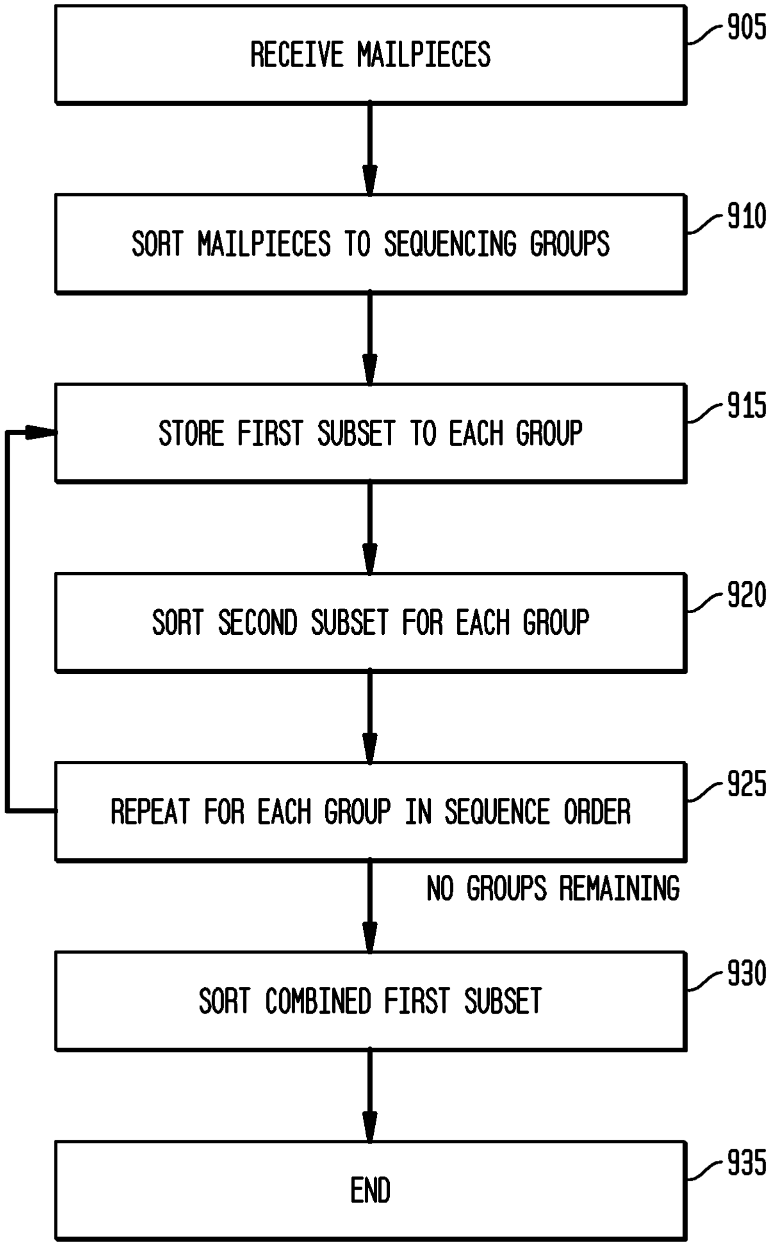

FIG. 9 depicts a flowchart of a process in accordance with disclosed embodiments. The "system" referred to in this process can be implemented as a mail processing system, such as a mail sorter or otherwise, and can include components as described above and other mail handling and processing components known to those of skill in the art.

The system receives a plurality of mailpieces to be sorted (step 905).

In a first pass, the system sorts the mailpieces into sequencing groups (step 910).

In a second pass, the system stores a first subset of the mailpieces in each sequencing group (step 915) and sorts a second subset of the mailpieces in each sequencing group to a plurality of outlets (step 920). In some embodiments, the first subset of mailpieces can have an even sort criterion and the second set of mailpieces can have an odd sort criterion.

The system repeats steps 915 and 920 in a group order for each sequencing group (step 925).

The system sorts the combined first-subset stored mailpieces from each of the sequencing groups into the plurality of outlets (step 930). In some embodiments, the first subset of mailpieces from each group are stored together in a buffer according to the group order.

The process ends (step 935). At this point, each of the outlets includes sorted mailpieces, in order. In particular examples, each second-pass outlet now includes mailpieces that are properly sorted in a destination radix sort.

Using an odd/even split as in the example above is simply one example of the use of the systems and methods disclosed herein. It is known to those skilled in the art that there are other methods of splitting a flow of delivery points. For example, extracting and buffering low density delivery points or groups of adjacent delivery points. Although several embodiments have been described in the foregoing detailed description and illustrated in the accompanying drawings, it will be understood by those skilled in the art that the invention is not limited to the embodiments disclosed but is capable of numerous rearrangements, substitutions, and modifications without departing from the spirit of the invention. Such modifications are within the scope of the invention as expressed in the claims.

Various embodiments include a method and system for sorting flat mail pieces. A method includes feeding mailpieces to be ordered, scanning for each mailpiece for indicia information, and then diverting to a plurality outlets according to a sort scheme implemented by a computerized control system in multi-pass operation. In some embodiments, in the first pass of a multi-pass mail sorting operation, the mail is sorted into sequencing groups, and the groups are fed in a subsequent pass in a group order. Each group is divided into subgroups during the subsequent pass, and one subgroup is sorted to a plurality of outlets while one or more subgroups are temporarily stored. The method includes sorting the stored mail to a plurality of outlets, and repeating the operation for subsequent groups in a multi-pass operation, thus increasing the number of delivery points that can be sequenced in a multi-pass operation with a given number of outlets.

In various embodiments, the storage device is a buffer feeder and the buffer storage capacity is calculated Vg/2*1/L=C. In various embodiments, there is a primary mail path and a buffer storage mail path and the buffer storage mail path merges into the primary mail path. In various embodiments, the system divides the groups into subgroups, and controls the timing of pick-off and singulation of groups. In various embodiments, the system can control the timing of emptying flat mail out of the buffer storage, determine which mail pieces will be buffered, and divert mail into the buffer feeder. In various embodiments, odd delivery points are a subgroup and even delivery points are another subgroup. In various embodiments, buffering mail in the first pass is used to provide additional outlets to sequence mail in a multi-pass operation.

It is important to note that while the disclosure includes a description in the context of a fully functional system, those skilled in the art will appreciate that at least portions of the mechanism of the present disclosure are capable of being distributed in the form of a computer-executable instructions contained within a machine-usable, computer-usable, or computer-readable medium in any of a variety of forms to cause a system to perform processes as disclosed herein, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs). In particular, computer readable mediums can include transitory and non-transitory mediums, unless otherwise limited in the claims appended hereto.

Although an exemplary embodiment of the present disclosure has been described in detail, those skilled in the art will understand that various changes, substitutions, variations, and improvements disclosed herein may be made without departing from the spirit and scope of the disclosure in its broadest form. Further, in various embodiments, the steps above can be performed concurrently, sequentially, or in a different order, or omitted, unless specified otherwise.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method performed by a mail sorting machine, the method comprising:
- receiving a plurality of mailpieces in an input of the mail sorting machine;
- sorting the mailpieces into a plurality of sequencing groups, each sequencing group includes a sequence of a first subset of odd numbered mailpieces of the plurality of mailpieces and a second subset of even numbered mailpieces of the plurality of mailpieces;
- storing the second subset of even numbered mailpieces in each sequencing group;
- sorting the first subset of odd numbered mailpieces in each sequencing group to a plurality of outlets, wherein storing the second subset and sorting the first subset are performed for each sequencing group by processing each sequentially in a group order; and
- sorting the stored second subset mailpieces to the plurality of outlets.

2. The method of claim 1, wherein the second subset of mailpieces from each group are stored together in a buffer according to the group order.

3. The method of claim 1, wherein the mailpieces in the outlets are sorted in a destination sort order.

4. A mail sorting machine, comprising:
- at least one controller;
- a feeder configured to receive a plurality of mailpieces; and
- a plurality of outlets; the mail sorting machine configured to
- sort the mailpieces into a plurality of sequencing groups, each sequencing group includes a sequence of a first subset of odd numbered mailpieces of the plurality of mailpieces and a second subset of even numbered mailpieces of the plurality of mailpieces;
- store the second subset of even numbered mailpieces in each sequencing group in a buffer feeder;
- sort the first subset of odd numbered mailpieces in each sequencing group to the plurality of outlets, wherein storing the second subset and sorting the first subset are performed for each sequencing group by processing each sequentially in a group order; and
- sort the stored second subset mailpieces from the buffer feeder to the plurality of outlets.

5. The mail sorting machine of claim 4, further comprising a diverter gate configured to divert the second subset of the mailpieces in each sequencing group to the buffer feeder.

6. The mail sorting machine of claim 4, wherein the buffer feeder is configured to singulate the stored second subset of the mailpieces and transfer the singulated mailpieces to a primary transport path of the mail sorting machine.

7. A mail sorting machine, comprising:
- at least one controller;
- a feeder configured to receive a plurality of mailpieces; and
- a plurality of outlets; the mail sorting machine configured to
- sort the mailpieces into a plurality of sequencing groups;
- store a first subset of the mailpieces in each sequencing group in a buffer feeder;
- sort a second subset of the mailpieces in each sequencing group to the plurality of outlets, wherein storing the first subset and sorting the second subset are performed for each sequencing group by processing each sequentially in a group order; and sort the stored first subset mailpieces from the buffer feeder to the plurality of outlets, wherein the buffer feeder has a buffer capacity C calculated according to $$C = \left(\frac{V_g}{2}\right)\left(\frac{1}{L}\right)$$

where Vg represents a total expected volume of the mailpieces and L represents a number of buffer splits L.

8. The mail sorting machine of claim 7, further comprising a diverter gate configured to divert the first subset of the mailpieces in each sequencing group to the buffer feeder.

9. The mail sorting machine of claim 7, wherein the buffer feeder is configured to singulate the stored first subset of the mailpieces and transfer the singulated mailpieces to a primary transport path of the mail sorting machine.

10. A non-transitory computer readable medium having program instructions stored thereon executable by one or more processors to control the operation of a mail sorting machine, the mail sorting machine having at least a controller and a plurality of outlets, wherein the instructions cause the mail sorting machine to:

receive a plurality of mailpieces in an input of the mail sorting machine;

sort the mailpieces into a plurality of sequencing groups, each sequencing group includes a sequence of a first subset of odd numbered mailpieces of the plurality of mailpieces and a second subset of even numbered mailpieces of the plurality of mailpieces;

store the second subset of even numbered mailpieces in each sequencing group;

sort the first subset of odd numbered mailpieces in each sequencing group to the plurality of outlets, wherein storing the second subset and sorting the first subset are performed for each sequencing group by processing each sequentially in a group order; and sort the stored second subset mailpieces to the plurality of outlets.

11. The computer-readable medium of claim 10, wherein the second subset of mailpieces from each group are stored together in a buffer according to the group order.

12. The computer-readable medium of claim 10, wherein the mailpieces in the outlets are sorted in a destination sort order.

13. A method performed by a mail sorting machine, the method comprising:

receiving a plurality of mailpieces in an input of the mail sorting machine;

sorting the mailpieces into a plurality of sequencing groups;

storing a first subset of the mailpieces in each sequencing group in a buffer feeder;

sorting a second subset of the mailpieces in each sequencing group to a plurality of outlets, wherein storing the first subset and sorting the second subset are performed for each sequencing group by processing each sequentially in a group order; and sorting the stored first subset mailpieces from the buffer feeder to the plurality of outlets, wherein the buffer feeder has a buffer capacity C calculated according to $$C = \left(\frac{V_g}{2}\right)\left(\frac{1}{L}\right)$$

where Vg represents a total expected volume of the mailpieces and L represents a number of buffer splits L.

14. The method of claim 13, wherein the first subset of mailpieces from each group are stored together in a buffer according to the group order.

15. The method of claim 13, wherein the first subset of mailpieces has an even sort criterion and the second set of mailpieces has an odd sort criterion.

16. The method of claim 13, wherein the mailpieces in the outlets are sorted in a destination sort order.

17. The method of claim 13, wherein the buffer feeder is configured to singulate the stored first subset of the mailpieces and transfer the singulated mailpieces to a primary transport path of the mail sorting machine.

* * * * *